Patented May 7, 1940

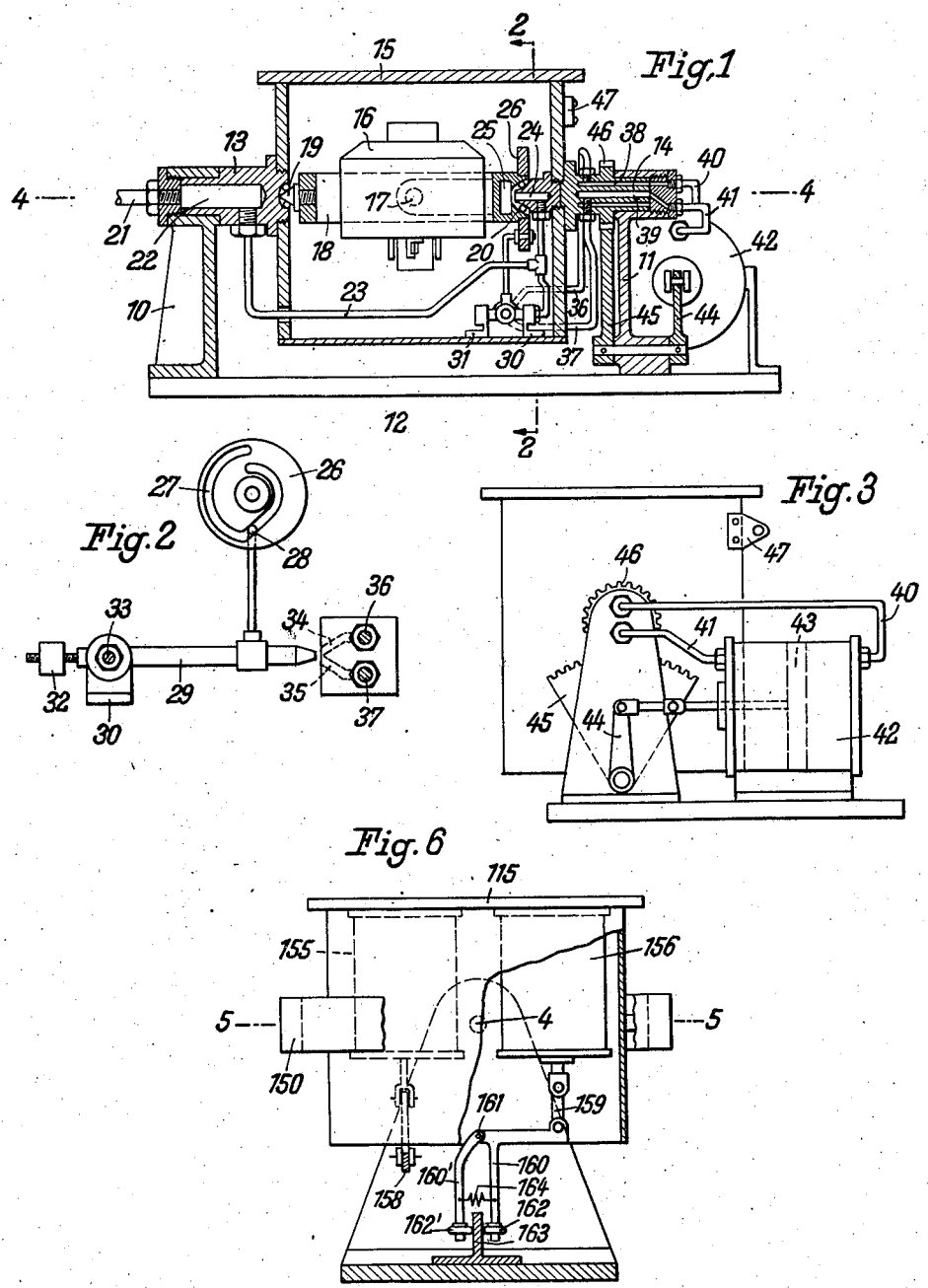

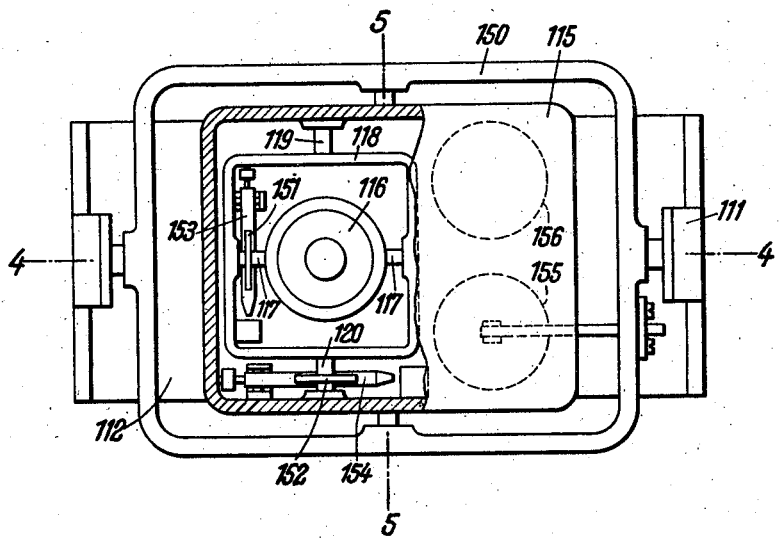
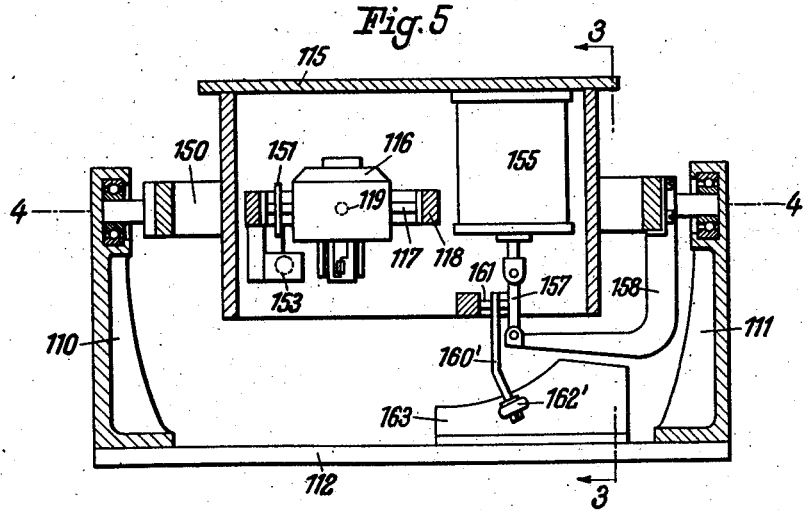

2,200,196

UNITED STATES PATENT OFFICE 2,200,196

STABILIZING DEVICE

Gert Zoege von Manteuffel, Berlin-Dahlem, Germany, assignor to Askania-Werke A. G., a corporation of Germany Application November 24, 1937, Serial No. 176,396
In Germany November 25, 1936

5 Claims. (Cl. 74—5)

This invention relates to stabilizing devices.

It is an object of this invention to provide a simple and reliable apparatus capable of exerting considerable forces for maintaining bodies mounted on a movable base, for example optical instruments mounted on craft, in a predetermined relative position with respect to an absolute direction, such as the true horizontal or vertical.

It is a further object of this invention to provide a stabilizing device in which a stable control is effected without the use of a follow-up connection.

Further aims, objects and advantages of this invention will appear from a consideration of the description which follows with the accompanying drawings showing for purely illustrative purposes embodiments of this invention. It is to be understood, however, that the description is not to be taken in a limiting sense, the scope of this invention being defined in the appended claims.

Referring to the drawings:

Fig. 1 is a sectional elevation of a device for stabilizing bodies about one axis.

Fig. 2 is an elevational view of some elements of Fig. 1, a section being taken on line 2—2.

Fig. 3 is a side elevation of the device shown in Fig. 1.

Fig. 4 is a plan view, partly in section, of a device for stabilizing bodies about two axes.

Fig. 5 is a sectional elevation of the device shown in Fig. 4.

Fig. 6 is a side elevation, partly in section, taken on line 3—3 of Fig. 5.

Bearings 10 and 11 are mounted on a base plate 12 for rotatably supporting trunnions 13 and 14 of a support 15 which is to be stabilized against movements of the base 12 about the axis 4—4 defined by the pivots 13 and 14.

A standard of direction, in the illustrated embodiment a gyro vertical 16 is mounted so that deviations of the support 15 about the pivotal axis 4—4 may be determined with respect to the true vertical represented by the gyro 16. For this purpose the gyroscope is mounted in the embodiment on the support 15. The gyro casing 16 is mounted in a gimbal ring 18 in pivots indicated at 17. The gimbal ring, in turn, is mounted in antifriction bearings 19 and 20 for freedom about an axis disposed at right angles to the gimbal axis 17 and parallel to the axis 4—4 of the support.

In the illustrated embodiment the gyroscope is shown to be of the air driven type. Air under pressure is supplied to the device through a conduit 21 terminating in a bore 22 of the pivot 13. From the bore 22 the air is conducted through a pipe 23 into a central bore 24 of the bearing 20 communicating with a channel 25 in the gimbal ring 18 whence it reaches the interior of the gyro casing 16 in a conventional manner through a hollow pivot 17.

For deriving a stabilizing impulse in response to angular deviations of the support 15 with respect to the gyro vertical a cam disk 26 is secured to the gimbal ring 18. The disk 26 is provided with a curved slot 27 in which a pin-shaped end of a rod 28 is guided for actuating a relay. In the illustrated embodiment a pressure fluid relay of the well-known Askania jet-pipe type is employed comprising a jet-pipe 29 mounted for pivotal movement in bearings 30 and 31 and suitably counter-balanced by an adjustable weight 32. The jet-pipe is supplied with pressure fluid through a hollow pivot 33 of the bearing 30 connected to the supply pipe 23 and issues a jet of pressure fluid into reception orifices 34 and 35 depending upon the relative position of the jet-pipe and the orifices.

Upon a relative displacement from the normal position of the gimbal ring 18 and the support 15 about the axis 4—4 the disk will be turned in one direction or the other causing the pin 28 to be moved in axial direction relatively to the disk 26 into the inner or outer concentric parts of the slot 27. The inner and outer concentric parts of the slot 27 are radially spaced from each other to permit the jet-pipe to be moved into both extreme positions in which the jet-pipe registers with one or the other of the reception orifices 34 and 35. In this manner a differential pressure will be created in conduits 36 and 37 connected to the reception orifices 34 and 35 which is a function of the relative angular displacement of the support 15 and the gyroscope 16. The conduits 36 and 37 terminate in concentric channels 38 and 39 of the pivot 14 communicating with stationary pipes 40 and 41. The pipes 40 and 41 lead to a servo-motor including a cylinder 42 and a piston 43 movable therein. The piston 43 is connected to a crank 44 turning a toothed segment 45 meshing with a pinion 46. The pinion 46 is secured to or integral with the trunnion 14 for turning the support 15 relatively to the base 12.

The operation of the device shown in Fig. 1 is as follows:

It may be assumed that the base 12 is mounted to move with a ship, while an optical instrument is carried by the support 15 for the purpose of becoming stabilized against inclinations of the ship with regard to the axis 4—4. When the ship becomes inclined, it tends to move the support 15 with it, thereby displacing the support relatively to the gyro vertical. After an almost imperceptible displacement the relay 29 becomes actuated and causes the servo-motor 43, 42 to turn the gear 45, 46 for moving the support into alignment with the gyro vertical. Accordingly, an instrument mounted on the support remains unaffected by movements of the ship about or parallel to the axis 4—4.

Instead of mounting the body to be stabilized on the support proper it may be movably mounted spaced from the support and actuated from the latter by means of a suitable motion transmitting connection, a lug 47 being provided in the illustrated example for this purpose.

By experiments it was found that no reaction will be exerted by the relay on the gyro vertical, when that section of the curved slot, which connects the inner and outer concentric sections is approximated disposed in a radial direction with regard to the pivotal axis of the jet-pipe, when the jet-pipe is in the neutral position in which an equal pressure is created in reception orifices 34 and 35.

In Figs. 4 to 6 a device is shown for stabilizing objects about two axes normal to each other. In these drawings all details not necessary for an understanding of the arrangement of the principal elements have been omitted for the sake of clearness, it being understood that constructional details of the apparatus may be designed according to the disclosure of Figs. 1 to 3.

The base plate 112 carries bearings 110 and 111 for supporting an outer gimbal ring 150 about an axis 4—4. A support 115 is mounted on the outer gimbal ring 150 for movement about an axis 5—5. A gyro vertical 116 is mounted on the support 115 in pivots 117 of a gimbal ring 118, the latter being mounted on the support proper in gimbals 119 and 120. The axis defined by the latter gimbals is arranged parallel with the axis 5—5 of the outer gimbal ring 150. Disks 151 and 152 are secured to the axes 117 and 120 of the gyroscope and the inner gimbal ring, respectively, for actuating relays 153 and 154. Servo-motors 155 and 156 are controlled by the relays 152 and 153 for moving the support about the axes 5—5 and 4—4, respectively.

The servo-motor 155 is for this purpose connected by means of a link 157 to a rigid arm 158 on the outer gimbal ring 150, thereby causing a movement of the support 115 about the axis 5—5.

The second servo-motor 156 controlled by the relay is connected by means of a link 159 to an angle lever 160 pivoted at 161 and provided with a roller 162 bearing against a rail 163. A second lever 160' also pivoted at 161 and provided with a roller 162' is connected with the angle lever 160 by means of a spring 164.

When the servo-motor 156 is actuated, the levers 160 and 160' will be turned about the axis 161, thereby causing the support 115 to be tilted about the axis 4—4. When at the same time the servo-motor 155 is actuated, the rollers 162 and 162' will travel on the rail 163 causing necessary adjustment about the axis 4—4 without impeding the movement about the axis 5—5.

Obviously the present invention is not restricted to the particular embodiments herein shown and described. Moreover it is not indispensable that all the features of this invention be used conjointly, since they may advantageously be employed in various combinations and subcombinations.

What is claimed is:

1. Stabilizing device comprising, in combination, a free gyroscope mounted with neutral equilibrium in gimbal suspension for movement about two normally horizontal axes, means for keeping the rotor spin axis in the true vertical, a housing enclosing the gyroscope and its suspension, a pair of journals at said housing in line with the major gimbal axis, a jet-pipe mounted for movement in accordance with the movements of the gyroscope about said major gimbal axis, means for supplying pressure-fluid to said jet pipe, reception orifices opposite thereto attached to said housing, and a fluid operated servo-motor connected to said orifices for turning said housing about said journals to follow the relative movements of the gyroscope, thereby keeping the housing stabilized and adapted to take up reactive loads without disturbance of the gyroscope.

2. Stabilizing device comprising, in combination, a free gyroscope mounted with neutral equilibrium in a gimbal ring for movement about two axes normally at right angles to the rotor spin axis, a housing enclosing the gyroscope and said ring, a pair of journals at said housing parallel to the major gimbal axis, a cam disc secured to the gimbal ring, a slot in said disc consisting of two concentric parts with different radii of curvature and an interconnecting part, comprising a fraction of the total steering angle, a pin engaging said slot, a jet pipe connected to said pin and moved by said disc when the gyroscope tilts about said major gimbal axis, means for supplying pressure-fluid to said jet pipe, reception orifices opposite thereto attached to said housing, and a fluid operated servo-motor connected to said orifices for turning said housing about its journals to follow the relative movements of the gyroscope, thereby keeping the housing stabilized and adapted to take up reactive loads without disturbance of the gyroscope.

3. Stabilizing device comprising, in combination, a base, a supporting frame journalled on said base for movement about a normally horizontal first axis, a housing journalled in said frame for movement about a normally horizontal second axis at right angles to said first axis, a gyroscope mounted within said housing with neutral equilibrium in gimbal suspension for freedom about two axes parallel to said first and second axis, respectively, means for keeping the rotor spin axis in the true vertical, two jet pipes each mounted for movement in accordance with the movements of the gyroscope about the corresponding gimbal axis, means for supplying pressure-fluid to said jet pipes, reception orifices opposite thereto attached to said housing, and two fluid operated servo-motors connected to said orifices for turning said housing about said first and second axis to follow the relative movements of the gyroscope, thereby keeping the housing stabilized and adapted to take up reactive loads without disturbance of the gyroscope.

4. Stabilizing device comprising, in combination, a base, a supporting frame journalled on said base for movement about a normally horizontal first axis, a housing journalled in said frame for movement about a normally horizontal second axis at right angles to said first axis, a gimbal ring mounted within said housing with pivots parallel to said first and second axis, respectively, a gyroscope in neutral equilibrium carried by said ring, means for keeping the rotor spin axis in the true vertical, two cam discs one on each of said gimbal pivots, two jet pipes each actuated by a cam disc for being moved in accordance with the movement of the gyroscope about the corresponding gimbal axis, means for supplying pressure-fluid to said jet pipes, reception orifices opposite thereto attached to said housing, and fluid operated servo-motors connected to said orifices for turning said housing about said first and second axis to follow the relative movements of the gyroscope, thereby keeping the housing stabilized and adapted to take up reactive loads without disturbance of the gyroscope.

5. Stabilizing device comprising, in combination, a base, a supporting frame journalled on said base for movement about a normally horizontal first axis, a housing journalled in said frame for movement about a normally horizontal second axis at right angles to said first axis, a gyroscope mounted within said housing with neutral equilibrium in gimbal suspension for freedom about two axes parallel to said first and second axis, respectively, means for keeping the rotor spin axis in the true vertical, a first jet-pipe connected to be controlled by the gyroscope upon tilt of the housing about said first axis, a first pair of reception orifices attached to the housing opposite said first jet pipe, a first fluid operated servo-motor mounted on said housing and communicating with said first pair of reception orifices for turning the housing about said first axis, a rail mounted on said base parallel to said first axis, means for guiding the movable part of the servo-motor on said rail to give the housing freedom to rock about said second axis, a second jet pipe connected to be controlled by the gyroscope upon tilt of the housing about said second axis, a second pair of reception orifices attached to the housing opposite said second jet pipe, a second fluid operated servo-motor mounted on said housing and communicating with said second pair of reception orifices for turning the housing about said second axis the movable part of the servo-motor being connected to said frame, and means for supplying pressure-fluid to said jet-pipes.

GERT ZOEGE von MANTEUFFEL.